United States Patent [19]

Frister

[11] 4,346,321

[45] Aug. 24, 1982

[54] SLIP RING RETAINER MECHANISM

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 211,865

[22] Filed: Dec. 1, 1980

Related U.S. Application Data

[63] Continuation of Ser. No. 6,921, Jan. 26, 1979, abandoned.

[30] Foreign Application Priority Data

Feb. 27, 1978 [DE] Fed. Rep. of Germany ....... 2808347

[51] Int. Cl.[3] ........................................... H02K 13/02

[52] U.S. Cl. .................................. 310/232; 339/5 R

[58] Field of Search ............... 310/232, 233, 234, 235, 310/45, 236, 219, 159, 224–226, 68 D, 165; 339/5 R, 5 A, 5 M, 6 R, 6 A, 8 R, 8 P, 8 PB, 8 PS; 174/138 R

[56] References Cited

U.S. PATENT DOCUMENTS

| | | | |
|---|---|---|---|
| 1,870,236 | 8/1932 | Chervenka | 310/232 |
| 3,059,202 | 10/1962 | Huber | 339/5 R |
| 3,685,514 | 8/1972 | Dube | 310/232 |
| 3,688,142 | 9/1972 | Förste | 310/232 |
| 4,100,440 | 7/1978 | Binder | 310/68 D |

FOREIGN PATENT DOCUMENTS

| | | | |
|---|---|---|---|
| 1101602 | 3/1961 | Fed. Rep. of Germany | 310/232 |
| 325626 | 12/1957 | Switzerland | 310/232 |
| 354833 | 7/1961 | Switzerland | 310/232 |
| 995833 | 6/1965 | United Kingdom | 339/5 M |
| 1266620 | 3/1972 | United Kingdom | 339/5 R |

*Primary Examiner*—R. Skudy

*Attorney, Agent, or Firm*—Frishauf, Holtz, Goodman & Woodward

[57] ABSTRACT

In order to prevent the exertion of high pressure during the installation of electrical slip rings on the armature shafts of electrical machinery, and to provide secure holding of the slip rings without exerting radial stresses, the slip ring retainer mechanism according to the invention provides pressure rings which are mounted on the armature shaft and which engage respective end faces of the electrical slip ring. In a preferred construction, the slip rings are loosely slipped over an intermediate metallic bushing on which the compressive rings are then press-fit so as to bear against the sides of the slip rings. The intermediate bushing has an outer insulating layer and the pressure rings may be provided with electrical connectors for coupling to the exciter windings on the armature. The end faces of the slip rings may be suitably shaped or grooved to make form-fitting engagement with similarly shaped mating surface features of the compression rings.

14 Claims, 3 Drawing Figures

SLIP RING RETAINER MECHANISM

This is a continuation of application Ser. No. 6,921, filed Jan. 26, 1979, now abandoned.

FIELD OF THE INVENTION

The invention relates to a mechanism for holding electrical slip rings on rotating shafts, for example in generators or motors. More particularly, the invention relates to a retainer mechanism for slip rings in A.C. generators used in motor vehicles in which graphite or graphite-metal slip rings transmit current to the exciter windings of the rotor.

BACKGROUND

Some electrical machinery have slip rings or collector rings mounted on the rotating shaft of the rotor. Electrical brushes which glide on the slip rings transmit electrical current typically exciter currents to the rotating parts of the machinery. Inasmuch as the slip rings or collector rings belong to the rotating parts of the machine, they must be affixed to the rotating shafts in a manner which insures the reliable transmission of the exciter currents to the rotor windings even at high rotor speeds. For this reason, the slip rings must be made from a material having high electrical conductivity, and often the slip rings are made of graphite or a suitable mixture of graphite and metal. These materials do not have the required rigidity and strength to withstand severe mounting forces or stresses which occur during operation. For this reason, it is known to provide graphite slip rings with pressed-in metal parts which can withstand tangential stresses as well as radial stresses that are applied when the slip rings are press fitted on the shaft during construction or centrifugal forces occurring due to imbalance at high speeds of operation. The construction of slip rings with metallic parts is quite expensive. It has been known in the art to mount graphite slip rings on shafts or hubs directly and without intermediate metal parts and to hold them in place through frictional forces or by means of adhesives. However, such bonds are often incapable of withstanding prolonged alternating stresses, especially changing temperatures at high speeds of operation. Such operation generates shear stresses which tend to adversely affect the bond between the slip rings and the shaft. Furthermore, the frictional forces exerted by the brushes also generate tangential stresses which must be absorbed by the bond.

The invention

It is thus an object of the present invention to provide a retainer for electrical slip rings of the type made of graphite or graphite metal mixtures which holds the slip rings in place by means of substantially exclusively axial pressure without subjecting the slip ring to any radial or tangential stresses which may occur upon mounting during continuous and heavy service.

Briefly, this object is attained by placing graphite, or graphite metal mixture slip rings on the shaft, for example loosely slipping them over a mounting bushing, and holding them in place thereon by pressure rings located axially adjacent the slip rings which make intimate axially directed form-fitting and force-transmitting contact. The pressure rings also serve for the transmission of the electrical currents passing through the slip rings. In a preferred embodiment coaxial the mounting bushing carries the adjacent axially force applying slip rings and the pressure rings. In accordance with advantageous features of the invention, the coaxial bushing is metallic but carries an insulating outer layer and may have a central annular bulge which serves to separate two adjacent slip rings from one another and to act as a counter element to accept axially directed forces. In another advantageous feature of the invention, the slip rings themselves have annular grooves which engage the central bulge and further engage the rounded edges of the axially adjacent pressure rings which hold them in place so as to provide intimate electrical and mechanical contact.

The invention will now be described by way of an illustrative example taken in conjunction with the drawing.

THE DRAWING

DETAILED DESCRIPTION OF THE ILLUSTRATIVE EMBODIMENT

Figure 1:
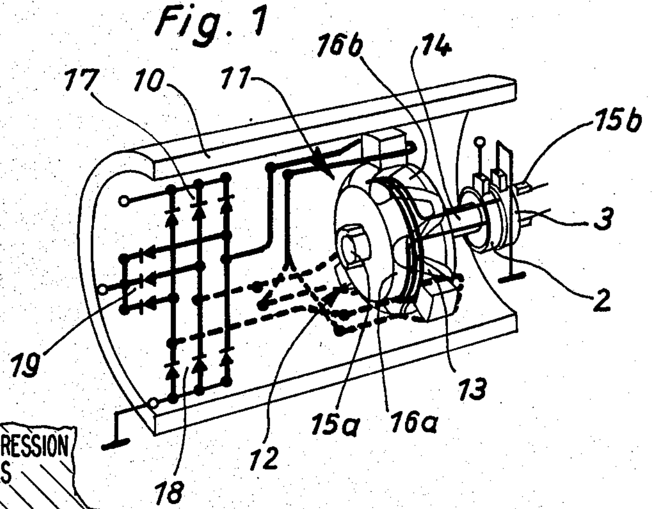
FIG. 1 is a partially cutaway perspective illustration of an A.C. generator equipped with two slip rings.

The slip ring retainer device according to the invention is useful and applicable to the mounting of electrical slip rings on shafts, hubs, or the like, in any type of electrical machinery, in particular on generators or motors which have slip rings or collector rings mounted on a roating shaft and associated brushes for the transmission of electrical currents thereto. In the preferred exemplary embodiment illustrated in the drawing, the electrical machine is an A.C. generator, especially as used in motor vehicles. The particular generator is a claw pole generator (FIG. 1) with a housing 10 surrounding a fixed three-phase stator winding 11 and a rotating armature 12 carrying exciter or field windings 13. The rotor is carried on a shaft 14 held in opposite bearings **15*a* and 15*b*. The designation of the generator as a claw pole generator derives from the configuration of the rotor 12 which consists of two halves 16*a*, 16*b*, each of which has claw-like poles which engage one another alternatingly in the manner illustrated. Mounted at one end of the shaft are slip rings 2 and 3 made of graphite, or a suitable graphite-metal mixture. The slip ring retainer mechanism according to the invention may be used, however, for holding and retaining any number of adjacent slip rings. The illustrated embodiment of FIG. 1 further includes six power diodes, 17, 18 as well as three exciter diodes 19 which are connected with the stationary stator windings. In a manner to be illustrated and described below, the slip rings 2 and 3** are mounted on the rotating shaft without the of radial or tangential stresses on the slip ring. The only stresses or forces exerted on the slip rings are axial stresses which the slip rings are better capable of sustaining because the graphite material of which the slip rings are made has a higher compressive strength than tensile strength.

Figure 2:
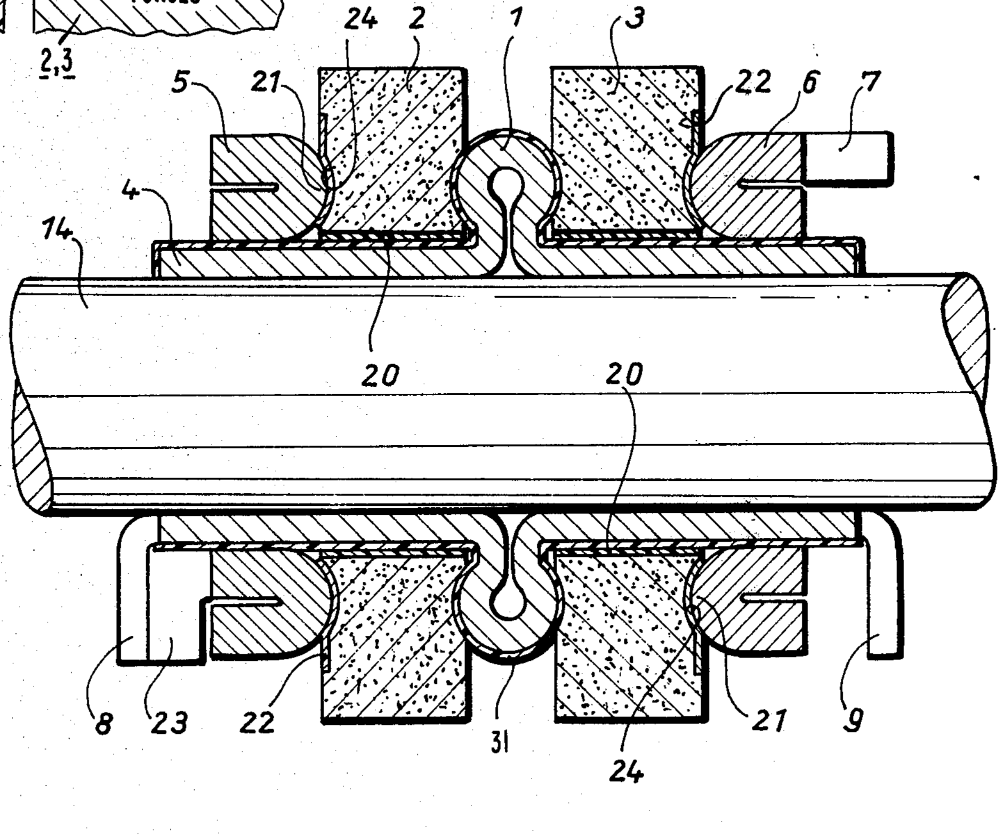
FIG. 2 is an axial sectional drawing through the slip ring retainer and the slip rings mounted thereon in an exemplary embodiment.

According to a basic feature of the invention, the slip rings are retained on the shaft by a mechanism which includes a first pressure ring 5 which is held on the rotating shaft in any suitable way and, on the other side, by a similar pressure ring 6. The rings 5, 6 bear against the end faces of the slip ring and exert only axial stresses. Preferably, the engaging surfaces of the pressure rings 5, 6 and the slip rings 2, 3 are so shaped that the slip rings are maintained in a fixed position so as to be able to resist any forces that may occur. In the preferred exemplary embodiment illustrated in FIG. 2, the slip ring retainer further includes an inner bushing 4, preferably made of metal so as to be capable of being used for the conduction of electrical current. The bushing has an inside diameter substantially equal to the outside diameter of the shaft and is coaxial therewith. The slip rings 2 and 3 are placed on the bushing 4 without the application of force, i.e., without being pressed thereon. The outer surface of the bushing 4 is provided with a suitable electrical insulation 31, for example of paper, plastic, or the like. The insulating material can also be applied as a coating. Inasmuch as the illustrated embodiment shows only two slip rings, it is possible to provide the bushing 4 with a central bulge 1 which serves as a spacer between the slip rings 2, 3 and as the support of one face of each of the two slip rings. The bulge 1 which supports the sides of slip rings 2, 3, remote from the rings 5, 6 thus also forms a counter element for the slip rings to accept the axial compression forces supplied by the rings 5, 6 (see also FIG. 3). However, the bulge 1 is not a necessary feature of the bushing because its place may be taken by intermediate discs or other pressure rings which are located between the slip rings 2 and 3. The latter construction would be more advantageous if a large number of slip rings is to be affixed to a single shaft. The slip rings 2 and 3, which are made of graphite or some graphite-metal mixture need not include any pressed-in metal parts. They make contact with the annular bulge 1 and are held against it by the axial pressure exerted by external metallic pressure rings 5 and 6, respectively, which are pressed onto the bushing 4 from either side. After the installation of the pressure rings, contact vanes 8 and 9 are bent outwardly and then constitute electrical connectors. If necessary, the inside surface of the slip rings 2 and 3, which are merely slipped onto the bushing, may also be provided with a supplementary insulating coating 20.

The exact form of the pressure rings 5 and 6 is not important. The pressure rings may be, for example, U-shaped double metal rings, with the edges of the U and the opening therebetween being essentially parallel to the axis of shaft 14 substantially as illustrated, and having one rounded surface 21 which engages suitable grooves 24 in the electrical slip rings 2 and 3. However, the edges of the pressure rings 5 and 6 may also be flat with relatively sharp edges. The areas of the slip rings which make contact with the pressure rings are preferably coated with a metal coating 22 of high electrical conductivity so that the pressure rings 5 and 6 may also be used for conducting electricity to and from the slip rings 2 and 3. In the illustrated exemplary embodiment, the pressure ring 5 is shown to have a metal tab 23 which serves to be connected electrically with the upwardly bent connecting tab 8 of the bushing 4, for example by pressure or soldering. In the example shown, the bushing 4 carries the electrical current from the slip ring 2 to a further electrical tab 9. Due to the insulating layer 31 on the bushing 4, the pressure ring 6 associated with the slip ring 3 does not make electrical contact with the bushing 4 so that a vane 7 forming a terminal connection means on the pressure ring 6 may serve as a connector for the exciter windings. Accordingly, the exciter current flows in the positive direction through the slip ring 3, and the connecting vane 7 to the exciter windings 13 and returns therefrom through the vane 9, the vane 8, the vane 23 on the pressure ring 5 and finally back to the slip ring 2. The contact vanes 7 and 9 thus constitute the connection points to the exciter windings of the rotor.

It is a feature of the invention that the axial surfaces of the slip rings can be shaped, for example by the inclusion of grooves or depressions, so as to permit form-fitting and intimate axially directed contact with the associated pressure rings. This construction further improves the security of the retention of the slip rings as well as providing especially effective electrical contact. In the embodiment shown, the end faces of the slip rings 2, 3 engaged by the bulge 9 are also suitably shaped.

The form-fitting connection provided by the slip ring retainer mechanism according to the invention completely absorbs any centrifugal forces occurring during operatio as well as radial and tangential forces due to temperature changes and further prevents the generation of radial stresses which normally occur when the slip rings are pressed on the shaft as has been done heretofore. Due to the absence of radial and tangential stresses in the slip rings themselves, these slip rings may be made from materials having excellent electrical properties but only limited rigidity, the mechanical strength required being only sufficient to insure adequate seating and the prevention of malfunctions when extreme radial stresses occur at high speeds due to internal imbalance.

Figure 3:
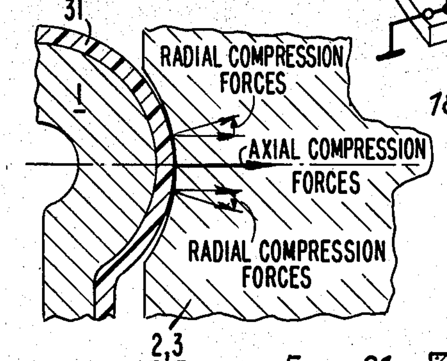
FIG. 3 is a force distribution diagram.

The radial strain should be as small as possible since tangential tension will result in the workpiece when it is applied by injection molding. The materials used will be subjected to strain; they can accept, however, high compressive forces and thus the arrangement is so made that primarily axially directed forces will occur. The result in radial strain forces are small and can be accepted by the materials. FIG. 3 illustrates the force distribution, showing radial, axial, and resultant forces.

Various changes and modifications may be made without departing from the scope of the inventive concept.

I claim:

1. In a dynamo electric machine, having a shaft (14), a slip ring retainer device for mounting at least two slip rings (2, 3) on the shaft comprising a material selected from the group consisting of graphite and a graphite metal mixture, positioned axially adjacent each other on the shaft (14) of the machine wherein the inside diameter of each of said slip rings (2, 3) is sufficiently large so that the respective slip ring is mounted on the shaft without the application of substantial radial force comprising means for applying axially directed compressive forces against the axial end faces of the slip rings mounted on said shaft at respective opposite axial faces of the adjacent slip rings for exerting substantially only axially directed retaining forces on said slip rings pressing the slip rings towards each other, said compressive force applying means including metallic pressure rings (5, 6) coaxially surrounding said shaft, positioned at respective opposite axial end faces of said slip rings, and applying axially directed retaining forces against the axial faces of the slip rings, said pressure rings being provided with terminal connecting means, and insulating separating means separating said slip rings from each other.

2. Device according to claim 1 further including a bushing (4) coaxially surrounding said shaft (14) said bushing (4) having an electrically insulating surface (31) applied to its outer side;

and wherein said rings are metallic pressure rings secured on said bushing (4).

3. Device according to claim 2 wherein the inside diameter of each of the slip rings (2, 3) is sufficiently large so that the respective slip ring is seated on said insulated bushing (4) without the application of substantial radial force.

4. Device according to claim 3 wherein said pressure rings (5, 6) are secured over said insulated bushing.

5. Device according to claim 1 wherein the separating means includes a spacer disposed between two of said slip rings (2, 3), said pressure rings (5, 6) exerting unilateral axial forces on said slip rings.

6. Device according to claim 2 including an electrically insulating unitary bulge integral with said bushing (4) said bulge forming a counter element and being disposed between two of said slip rings (2, 3).

7. Device according to claim 1 wherein the axial surfaces of said slip rings (2, 3) are formed with depressions which form - fittingly engage corresponding surfaces of said pressure rings (5, 6).

8. Device according to claim 1 wherein the axial faces of said slip rings (2, 3) are formed with depressions which form - fittingly engage corresponding surfaces of said pressure rings and of said bulge (1).

9. Device according to claim 6 wherein said pressure rings (5, 6) are, in cross section, generally U-shape, in which the opening between the legs of the "U" extends in axial direction and the radially inner leg of the "U" is essentially parallel to the axis of the shaft (14) and seated on said bushing (4).

10. Device according to claim 8 wherein the axially directed surfaces of said slip rings (2, 3) adjacent to, and engaged by said pressure rings (5, 6) are provided with a metallic coating for the purpose of improved electrical conduction;

and wherein said terminal connection means are connecting vanes (23, 7) for connecting said pressure rings to the exciter winding of the dynamo electric machine.

11. Device according to claim 1 wherein the pressure rings (5, 6) are, in cross section, generally U-shaped with the legs of the "U" extending parallel to the axis of the shaft, and the bend of the "U" fitting against the respective opposite axial faces of the slip rings (2, 3) and there applying said axial forces.

12. Device according to claim 11 wherein the axial faces of said slip rings (2, 3) are formed with depressions matching, generally, the outer surfaces of the bend of the "U" and form fittingly engage said matching surface of said pressure rings.

13. Device according to claim 12 wherein the separating means comprises a bushing (4) coaxially surrounding the shaft (14), said bushing having an electrically insulating surface (31) applied to its outer side, said pressure rings being metallic pressure rings secured on said bushing; and an electrically insulating unitary bulge formed on said bushing and integrally therewith, said bulge forming a counter element and being disposed between two of said slip rings (2, 3) and having outer surfaces essentially similar to the surfaces of the U-shaped pressure rings and fitting into matching depressions in said slip rings (2, 3).

14. Device according to claim 1 or 2 or 3 or 4 or 5 or 6 or 7 or 8 or 9 or 10 or 11 or 12 or 13, wherein said dynamo electric machine comprises an automotive alternator having a rotating field structure including a field winding (13);

and means connecting the field winding (13) to respective slip rings (2, 3).

* * * * *